April 2, 1957    R. PECKHAM ET AL    2,787,033
WEATHER STRIP
Filed June 30, 1954

INVENTORS
ROY PECKHAM
BY & FRANK ELMS

ATTORNEY

United States Patent Office 2,787,033
Patented Apr. 2, 1957

2,787,033

WEATHER STRIP

Roy Peckham, Detroit, and Frank Elms, Roseville, Mich.

Application June 30, 1954, Serial No. 440,410

4 Claims. (Cl. 20—69)

This invention relates to a weatherstrip and more particularly to a weatherstrip especially adapted for use on motor vehicle bodies to seal the opening around the doors or windows.

The objects of the invention are to provide an improved weatherstrip construction which facilitates the mounting of the strip; to provide a strip having deformable and resilient stiffening means therein forming a transversely bendable portion between the framing and closure such that the weatherstrip will conform to the curved opening for the closure; and to form fastening devices associated with the stiffening means which may be formed as an integral part of the weatherstrip and snapped into the supporting frame, or the fastening devices may be first applied to the frame and the stiffening means of the weatherstrip hooked over the fasteners; the weatherstrip being pierced by the fasteners in assembly of the stiffening means to the fasteners.

With the above and other objects in view, the invention consists in providing the strip with continuous wire strips which are spaced transversely of the strip at intervals of the fastener spacing and are twisted into a single strand between each spacing of the wires, whereby the weatherstrip is free for bending between the fasteners without stretch.

Other advantages and objects of the invention will more fully appear from the following description taken in connection with the accompanying drawings, in which.

Figure 1:
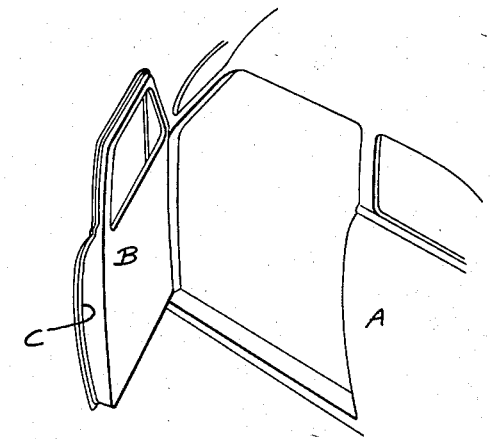
Fig. 1 is a perspective view of an automobile door for an opening, showing an application of the improved weatherstrip.

Referring to the drawings, we have illustrated an automobile body frame at A and a door at B. The edge of the door is provided with a weatherstrip C for sealing engagement with the edge of the opening in the body frame A. The surface of the door to which the weatherstrip is applied is of irregular shape, conforming to the round corners of the door and body styling. It is desirable to apply the weatherstrip to the door in a continuous strip and to snap the strip to fasteners provided in the door or to snap the fasteners, previously molded in the strip, in openings in the door.

Figure 3:
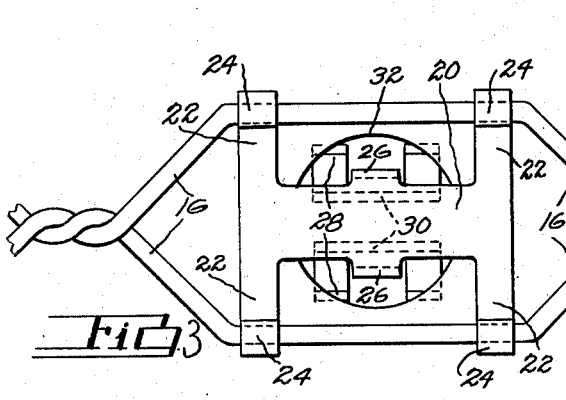
Fig. 3 is a top plan view of a portion of the stiffening wire and fastener, showing the spaced apart wires section and the twisted together sections.

The weatherstrip comprises a flexible, soft, rubber like strip 10 having a laterally deflectable flange 12 and a base portion 14. Two strands of wire 16 are molded in the base portion 14 of the strip throughout its length. These strands are spaced apart transversely of the base at spaced intervals, as shown in Fig. 3, and the strands are twisted together between each spaced portion.

Figure 2:
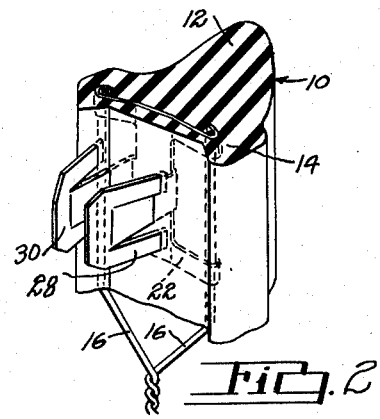
Fig. 2 is a perspective view of a portion of a weatherstrip, showing the fastener secured to the stiffening wires and molded into the body of the weatherstrip.
Figure 4:
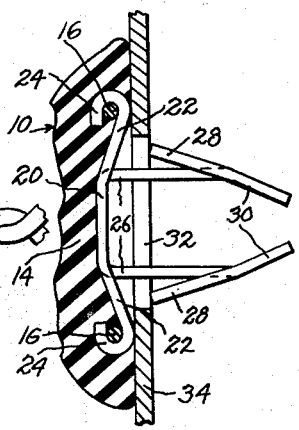
Fig. 4 is a sectional view of the weatherstrip showing the stiffening wire attached to the fastener and the fastener to a support.

The fastener which we have selected for securing the weatherstrip to the door is illustrated as having a base portion 20 and laterally, outwardly extending flanges 22. There are four flanges, one at each of the four corners of the base portion 20. The outer free ends of each flange are reversely bent around the spaced wires 16, as indicated at 24. Formed from the body of the fastener and projecting downward, substantially at right angles to the base portion 20, are flanges 26. Each flange is cut longitudinally throughout a portion of its length toward the outer free ends so as to provide side portions 28 which are bent outwardly out of the plane of the flanges 26. The free ends of the flanges 26 are bent inwardly providing inturned guide portions 30. In the form shown in Figs. 2, 3 and 4, the base of the fasteners with the free ends of the flanges 24 bent over the spaced wires 16, is molded into the base of the weatherstrip. These fasteners are located at spaced intervals along the length of the weatherstrip and the wires are bent together into a single strand between the fasteners. The weatherstrip is then assembled to the door by snapping the resilient exposed ends of the fasteners into spaced openings 32 in the door panel 34.

Figure 5:
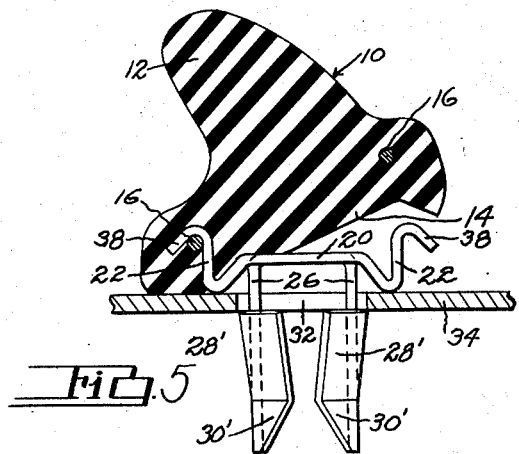
Fig. 5 is a cross sectional view of the weatherstrip and support, showing the method of application of the strip to the fastener, which is shown in side elevation and secured to the support.

If desired, the fasteners may be formed as indicated in Fig. 5 with the outer free ends of the flanges 22 bent downwardly to provide a hook, as at 38, and the side edges of the partially severed flanges 28' and guide portions 30' are bent inwardly transversely of the flanges 26. These fasteners are first applied to the door panel and the weatherstrip hooked over the flanges 22 of the fasteners. The weatherstrip being of soft rubber, the hook-like ends 38 pierce the rubber and the wires, previously molded into the rubber, are hooked underneath the hooks; there being enough stretch in the rubber to permit the required separation of the spaced wires to permit the "hook-on" operation.

From the above it will be understood that a weatherstrip has been provided which is flexible and free for bending around the curves of a door in applying the weatherstrip. It is free for bending in any direction between the spaced portion wires and the twisted strands of wire function as a core to the molded rubber weatherstrip.

We have herein illustrated and described a preferred embodiment of the invention and it will be understood that various changes, including the size, shape and arrangement of parts, as well as the fastener design, may be made without departing from the spirit of our invention and it is not our intention to limit its scope other than by the terms of the appended claims.

We claim:

1. A resilient weatherstrip element adapted for securement to a sheet metal member having a series of apertures therealong, said element comprising a strip of rubber-like resilient material having a base portion and a laterally deflectable flange, said base portion having a pair of longitudinally extending wires embedded therein, said wires being spaced transversely of the base portion at spaced intervals and twisted together into a single strand between each transversely spaced portion, and fasteners between the spaced wires and said apertured sheet metal member.

2. A resilient weatherstrip element adapted for securement to a sheet metal member having a series of apertures therealong, said element comprising a strip of rubber-like resilient material having a base portion and a laterally deflectable flange, said base portion having a pair of longitudinally extending wires embedded therein, said wires being spaced transversely apart of the base portion at spaced intervals and twisted together into a single strand between each transversely spaced portion, and sheet metal fasteners having wire engaging portions which are molded in the base of said element and snap fastener portions projecting outwardly beyond the base of said element for insertion into the apertures in said sheet metal member.

3. A resilient weatherstrip element adapted for securement to a sheet metal member having a series of apertures therealong, said element comprising a strip of rubber-like resilient material having a base portion and a laterally deflectable flange, said base portion having a pair of longitudinally extending wires embedded therein, said wires being spaced transversely apart of said base portion at spaced intervals and twisted together into a single strand between each transversely spaced portion, and sheet metal fasteners adapted for insertion into the apertured sheet metal member, said fasteners having laterally projecting hooks to be received over the spaced wires by piercing the hooks through the rubber-like material.

4. A resilient weatherstrip element comprising a strip of rubber-like resilient material having a base portion and a laterally deflectable flange, and a pair of longitudinally extending wires embedded therein, said wires being spaced transversely of the base portion at spaced intervals and twisted together into a single strand between the transversely spaced portions.

References Cited in the file of this patent

UNITED STATES PATENTS

| | | |
|---|---|---|
| 2,161,648 | Widman | June 6, 1939 |
| 2,612,665 | Scott | Oct. 7, 1952 |